May 4, 1965  O. B. CRUSE  3,181,433

FRICTION DEVICE OPERATING MECHANISM

Original Filed Oct. 12, 1962  2 Sheets-Sheet 1

INVENTOR:
OLIVER B. CRUSE
BY:
Joseph E. Papin

May 4, 1965 O. B. CRUSE 3,181,433
FRICTION DEVICE OPERATING MECHANISM
Original Filed Oct. 12, 1962 2 Sheets-Sheet 2

INVENTOR:
OLIVER B. CRUSE
BY: *Joseph E. Papin.*

United States Patent Office 3,181,433
Patented May 4, 1965

3,181,433
FRICTION DEVICE OPERATING MECHANISM
Oliver B. Cruse, Florissant, Mo., assignor to Wagner Electric Corporation, St. Louis, Mo., a corporation of Delaware
Original application Oct. 12, 1962, Ser. No. 230,141. Divided and this application Sept. 28, 1964, Ser. No. 399,573
15 Claims. (Cl. 92—52)

This is a division of co-pending application, Serial No. 230,141 filed October 12, 1962, for Friction Device Operating Mechanism.

This invention relates to friction device operating mechanisms and in particular to a friction device operating mechanism having emergency actuating means therein.

An object of the present invention is to provide a self-contained friction device operating mechanism for a vehicle pressure fluid system having resiliently urged emergency means with service actuating means reciprocally mounted therein, said resiliently urged emergency means and service actuating means being concertly movable for friction device energizing purposes under emergency conditions when the fluid pressure supplied from said system to said resiliently urged emergency means is less than a predetermined amount and being relatively movable in response to fluid pressure metered thereto from said system for fluid pressure friction device energizing purposes.

Another object of the present invention is to provide a friction device operating mechanism having means therein for limiting the friction device energizing force thereof.

Another object of the present invention is to provide a friction device operating mechanism having resiliently urged means therein for mechanically energizing a friction device and disabling means operatively connected with said resiliently urged means to de-energize said friction device.

These and other objects and advantages will become apparent hereinafter.

Briefly, the invention embodies resiliently urged emergency means for energizing a friction device when fluid pressure applied thereto from the source of fluid pressure is less than a predetermined amount and service means reciprocally mounted in said emergency means for energizing said friction device in response to fluid pressure metered thereto from said source. The emergency means also embodies disabling means for overcoming the emergency function of the resiliently urged means when the fluid pressure of the source is less than the predetermined amount.

Figure 2:
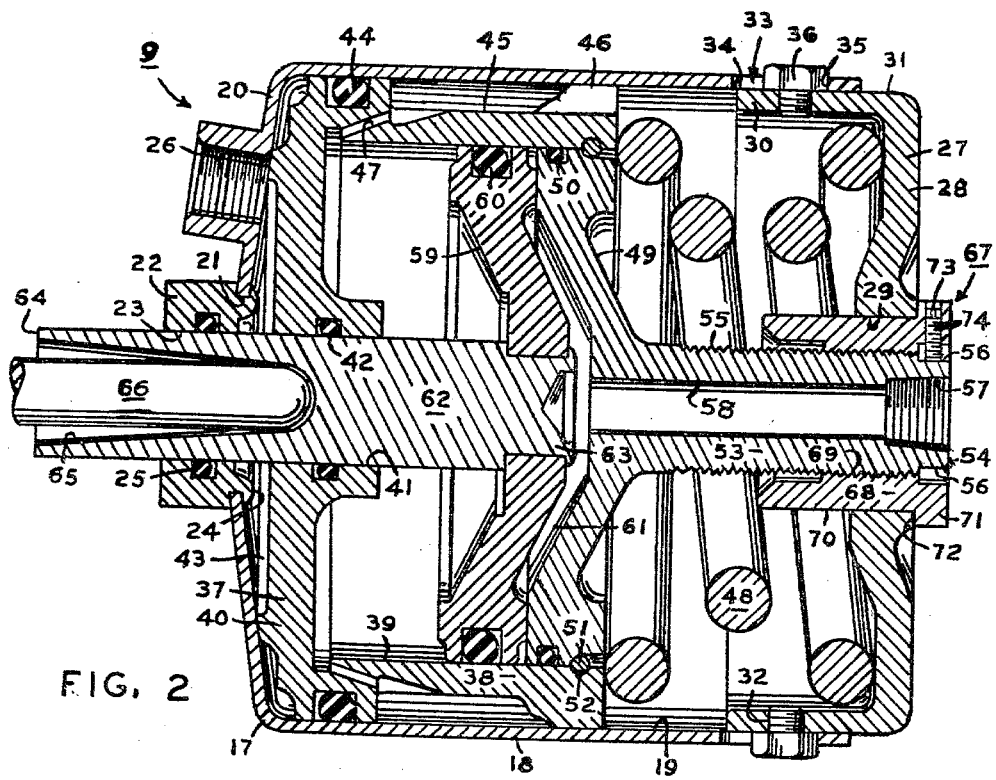
Figure 1:
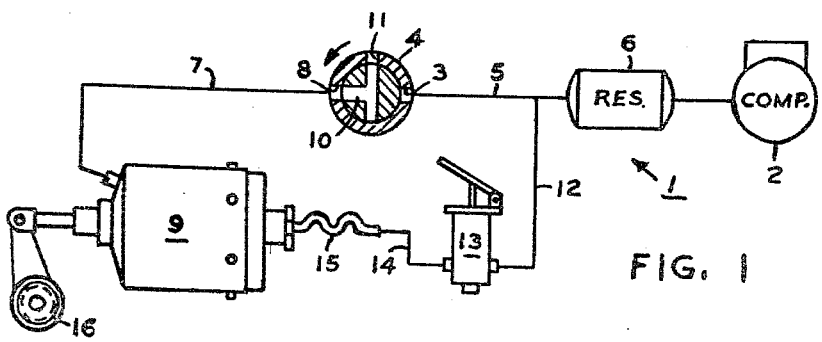
Figure 3:
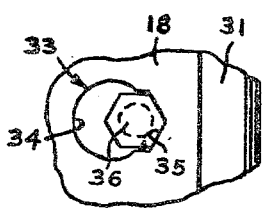
Figure 5:
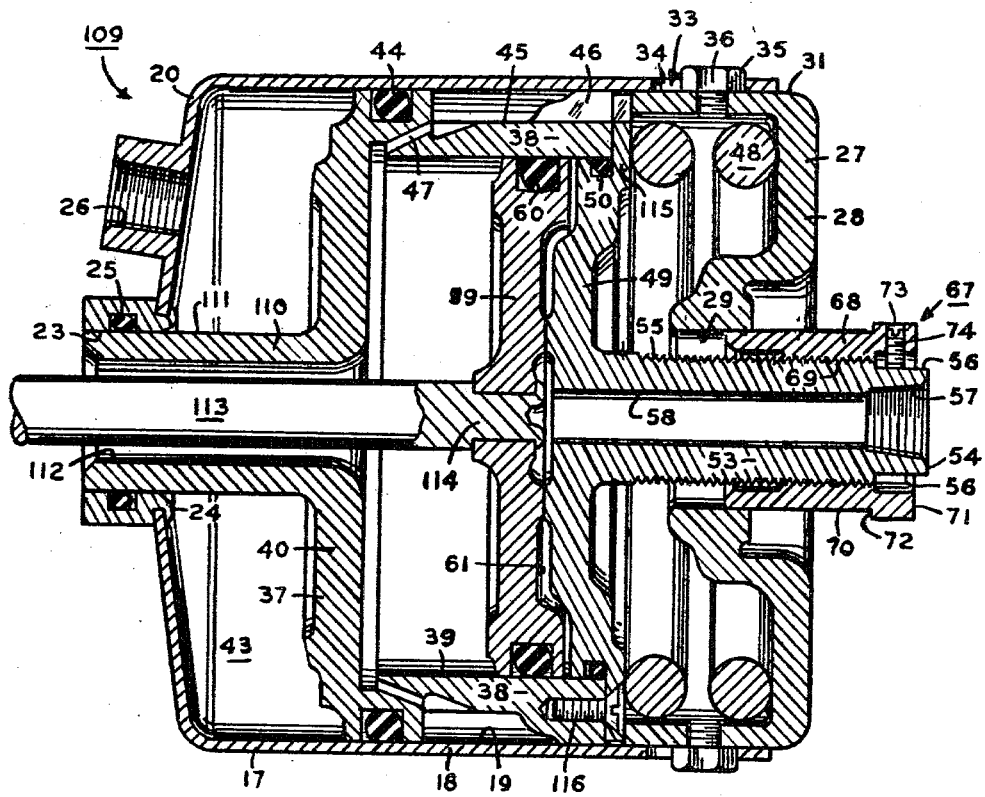
Figure 4:
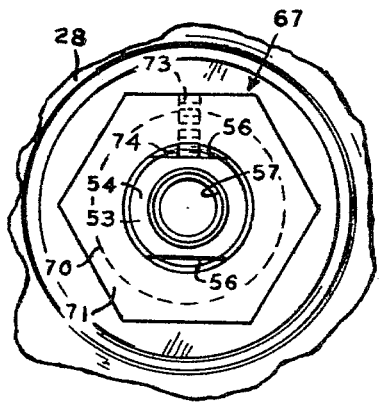

The invention also consists in the parts and arrangement of parts hereinafter described and claimed. In the accompanying drawings which form a part of the specification and wherein like numerals refer to like parts wherever they occur:

FIG. 1 is a diagrammatic view of an actuating system showing a friction device operating mechanism embodying the present invention therein, FIG. 2 is a greatly enlarged cross-sectional view of the friction device operating mechanism in FIG. 1, FIG. 3 is a fragmentary view of the friction device operating mechanism in FIG. 2 showing the housing retaining means employed therein, FIG. 4 is a fragmentary right-side view of the friction device operating mechanism shown in FIG. 2, and FIG. 5 is a cross-sectional view of another friction device operating mechanism embodying the present invention.

Referring now to FIG. 1 in detail, a friction device actuating system, indicated generally at 1, is provided with pressure generating means, such as compressor 2, which is connected to the inlet 3 of a charging or control valve 4 by a conduit 5. A fluid pressure storage reservoir 6 is interposed in the conduit 5 forming, in combination with the compressor 2, a source of fluid pressure, and another conduit 7 is interposed between an outlet 8 of the charging valve 4 and an emergency port of a friction device operating mechanism or actuating cylinder 9. The charging valve 4 is provided with rotatable passage means 10 connecting the outlet 8 in pressure fluid communication with an exhaust port 11 to vent said outlet to atmosphere; however, said passage means can be rotated counterclockwise to a position in said charging valve establishing communication between said outlet and the inlet 3. A conduit 12 has one end intersecting with the conduit 5 and the other end thereof connecting to the inlet side of an application valve 13, and another conduit or service line 14 having a movable or resilient portion 15 is interposed between a service or outlet side of said application valve and the service port of the actuating cylinder 9. To complete the system 1, the push rod of the actuating cylinder 9 is pivotally connected with linkage means or actuating lever, such as slack adjustor 16, for energizing a friction device (not shown).

The actuating cylinder 9, FIG. 2, is provided with a housing or cylinder 17 having an annular side wall 18 with a bore 19 therein, and an end wall 20 is integrally formed with said side wall 18 closing one end of the housing bore 19. The end wall 20 is provided with a centrally located aperture 21, and an annular member 22 having an axial bore 23 therethrough is fixedly positioned in the end wall aperture 21 by suitable means, such as staking, at 24. An O-ring seal 25 is carried in the annular member bore 23, and an emergency port 26 which receives the conduit 7, as previously mentioned, is provided in the housing 17 extending through the end wall 20 into open pressure fluid communication with the housing bore 19. A closure member 27 is provided with a radially extending wall 28 defining an axial opening 29 in the central portion thereof, and said wall 28 is integrally connected with an annular peripheral flange 30. The closure member flange 30 is provided with a peripheral surface 31 which is slidably received in the rightward end of the housing bore 19, and a plurality of threaded cross passages 32 are provided in said closure member flange in predetermined alignment with a plurality of openings 33 provided through the housing side wall 18 adjacent the rightward end thereof.

As shown in FIGS. 2 and 3, the openings 33 include a substantially circular aperture 34 which is intersected on one side thereof by a stud head receiving portion 35, and studs 36 are threadedly received in the threaded cross passages 32 of the closure member 27 with the head portions thereof fixedly positioned in the stud head receiving portion 35 of the openings 33. The engagement between the head portions of the studs 36 and the stud receiving portion 35 of the openings 33 normally prevent undesired rotation of said studs to obviate displacement thereof from the closure member cross passages 32.

A power or emergency piston 37 is provided with a sleeve portion 38 having a sleeve bore 39 therein. One end of the sleeve bore 39 is closed by a radially extending head portion or end wall 40 which is integrally connected with said sleeve portion adjacent the leftward end thereof. The end wall 40 is provided with an axial bore 41 therethrough in alignment with the annular member bore 23, and an O-ring seal 42 is carried in the end wall bore 41. An expansible emergency chamber 43 is formed in the housing bore 19 between the piston head 40 and housing end wall 20 in open pressure fluid communication with the emergency port 26. Another O-ring seal 44 is carried in the emergency piston 37 adjacent the leftward end of the sleeve portion 38 in sealing engagement with the housing bore 19, and a peripheral recess 45 is provided in said sleeve portion between the O-ring seal 44 and a plurality of spaced guide flanges 46 integrally connected with said sleeve portion adjacent the rightward end thereof. A plurality of venting passages 47 are provided in the sleeve portion 38 having one end intersecting with the leftward end of the sleeve bore 39 and the other end thereof connecting with the peripheral recess 45. An emergency spring 48 is interposed between the closure member end wall 28 and the rightward end of the piston sleeve 38 normally urging the emergency piston 37 in a working direction toward an operative position to engage the piston head 40 with the housing end wall 20.

A base wall or bore closure member 49 is slidably received in the sleeve bore 39, and an O-ring seal 50 is carried in the peripheral portion thereof in sealing engagement with said sleeve bore. The base wall member 49 is normally engaged with a split snap ring or retainer member 51 positioned in a cooperating groove 52 adjacent the rightward end of the sleeve bore 39 and is thereby retained against displacement from said sleeve bore. A cylindrical extension 53 is integrally provided on the base wall member 49 and extends coaxially through the opening 29 in the closure member 27 having a free end 54 exteriorly thereof. The extension 53 is provided with a threaded peripheral surface 55, and a plurality of flats 56 are provided adjacent to the free end 54. A service port 57 which receives the conduit 15, as previously mentioned, is provided in the free end 54, and an axial passage 58 which extends through the extension 53 and base wall member 49 has one end connecting with said service port and the other end thereof in open pressure fluid communication with the sleeve bore 39.

A service piston or actuator 59 is slidably received in the sleeve bore 39, and an O-ring seal 60 is carried in the peripheral portion thereof in sealing engagement with said sleeve bore. An expansible service chamber 61 is provided in the sleeve bore 39 between the service piston 59 and base wall member 49 in open pressure fluid communication with the passage 58 and service port 57. The service piston 59 is provided with an extension or push rod 62 which is connected thereto by suitable means, such as staking at 63, and said extension is slidably received in the piston head bore 41 and annular member bore 23 having a working end 64 exteriorly of the housing 17. An axial recess 65 is provided in the working end 64 to pivotally receive a push rod 66 which is operatively connected to the slack adjustor 16, as previously mentioned. The service piston 59 is normally engaged with the base wall member 49 by the force of the resilient means of the friction device (not shown) which is a well-known expediency in the art; however, if desired, a separate return spring (not shown) could be interposed between the piston head 40 and said service piston.

To complete the actuating cylinder 9, disabling or emergency release means, indicated generally at 67, is provided to mechanically effect retractile movement of the emergency piston 37 in a non-working direction against the compressive force of the spring 48, as described hereinafter. Disabling means 67 is provided with a cylindrical body 68 having an axial threaded bore 69 therethrough, a peripheral surface 70, and a hexagonally-shaped flange 71 integrally formed adjacent the rightward end thereof. The threaded bore 69 is cooperatively received on the threaded peripheral surface 55 of the base wall extension 53, and the peripheral surface 70 of the body 68 is slidably and guidingly received in the closure member opening 29. The flange 71 is provided with a bearing surface 72 for bearing engagement with the closure member end wall 28 about the opening 29, and a threaded cross-passage 73 is provided in said flange intersecting with the bore 69. A set screw 74 is threadedly received in the cross-passage 73 and normally has one end in abutting engagement with the flat 56 on the free end 54 of the base wall extension 53 to prevent relative rotation of the body 68 and said base wall extension.

In the operation with the component parts of the system 1 and actuating cylinder 9 positioned as above described and as shown in FIGS. 1 and 2, the friction device (not shown) is mechanically energized. Assuming that normal operating conditions exist wherein the storage reservoir 6 is charged with fluid pressure above a predetermined amount from the compressor 2, rotation of the charging valve rotatable passage 10 in a counter-clockwise direction (as shown by the arrow in FIG. 1) connects said reservoir in fluid pressure communication with the emergency chamber 43 through the emergency port 26, the conduit 7, the outlet 8, passage means 10 and inlet 3 of the control valve 4, and the conduit 5. Fluid pressure so transmitted to the emergency chamber 43 acts on the effective area of the emergency piston head 40 creating an emergency force to retractively urge the emergency piston 37 in a non-working direction toward an inoperative position and into engagement with the closure member flange 30 against the compressive force of the emergency spring 48. As previously mentioned, the compressive forces of the friction device components normally maintain the service piston 59 in engagement with the emergency piston base wall 49 so that said service piston is concurrently movable with said emergency piston 37 to de-energize the friction device.

If the operator desires to initiate a normal service application to energize the friction device and effect deceleration or a complete stop, a manual force applied on the application valve 13 meters fluid pressure from the reservoir 6 through conduits 5 and 12, said application valve, the service line 14 and 15, and the service port 57 and passage 58 into the service chamber 61. The fluid pressure so established in the service chamber 61 acts on the effective area of the service piston 59 creating a service force to move said service piston 59 and extension 62 leftwardly to actuate the working end 64 of said extension, the push rod 66 and slack adjustor 16 and energize the friction device. When the applied force is removed from the application valve 13, the fluid pressure is exhausted to atmosphere from the service chamber 61 through the passage 58 and service port 57, conduits 14 and 15, and the exhaust port of said application valve to eliminate the service force, and the spring forces of the friction device are utilized to move the slack adjustor 16, push rod 66, extension 62 and service piston 59 to their original inoperative positions.

In an emergency condition when the fluid pressure in the reservoir 6 is reduced below the predetermined amount due to leaks in the system 1 or a non-producing compressor 2, or the like, the fluid pressure in the emergency chamber 43 is correspondingly reduced thereby reducing the emergency force opposing the compressive force of the emergency spring 48. When the magnitude of the emergency spring force overcomes the reduced emergency force, the spring 48 is extendable to urge the emergency piston 37 leftwardly in a work-producing direction toward an operative position wherein the piston head 40 is moved toward abutting engagement with the housing end wall 20. Since the service piston 59 is abuttingly engaged with the end wall member 49, said service piston and the extension 62 are concertly moved leftwardly in a working direction toward their operative position to actuate the extension working end 64, push rod 66 and slack adjustor 16 and effect mechanical energization of the friction device. When the friction desice is so mechanically energized, disabling means 67 is also concertly movable in a leftward direction with the emergency piston 37. While the friction device is mechanically energized under emergency conditions, the operator may also initiate a service application, as above described, if desired; however, the service force so established to actuate the service piston 59 is, in effect, absorbed or cancelled since the fluid pressure metered to the service chamber 61 also acts on the effective area of the end wall member 49 of the emergency piston 37 creating a substantially equal and opposite reaction force. The reaction force serves to move the emergency piston 37 rightwardly against the compressive force of the emergency spring 48 thereby preventing compounding of the emergency spring and service forces. In view of the above, it is obvious that the compression of the emergency spring 48 in response to rightward movement of the emergency piston 37 by the reaction force substantially absorbs or cancels the service force and limits the maximum friction device energizing force of the actuating cylinder 9 by preventing the compounding of the service and emergency spring forces, which compounding of forces might serve to bend or fracture some component parts of said actuating cylinder, linkage or friction device.

With the component parts of the system 1 and actuating cylinder 9 positioned as above described, the friction device is mechanically energized under emergency conditions to effect an emergency vehicle stop. Often such emergency vehicle stops occur at inopportune times and place the vehicle in a dangerous position with regard to other vehicles on the road; therefore, after such emergency stops occur, it is advantageous and desirable to move the vehicle to a less dangerous position to correct the failure in the system 1 and/or actuating cylinder 9 and subsequently re-establish normal operations. Emergency release means 67 is provided to positively contain the compressive force of the emergency spring 48 and retractively move the emergency piston 37 toward its inoperative position to de-energize the friction device under emergency conditions, as hereinafter described. The set screw 74 is manually moved out of engagement with the flat 56 on the base wall extension 53, and a force is manually applied on the force-transmitting flange 71 to rotate the body member 68. Initially the threaded engagement between the body member bore 69 and extension peripheral surface 55 effects leftward movement of the body member 68 in response to the applied force thereon to engage the bearing surface 72 of the flange 71 with the closure member end wall 28. With the bearing surface 72 in bearing engagement with the closure member end wall 28, further rotation of the body member 68 in response to the applied force effects further threaded engagement between the threaded bore 69 and the extension peripheral surface 55 to retractively move the emergency piston 37 against the compressive force of the emergency spring 48 toward the inoperative position thereof. In view of the above, it is apparent that the emergency spring 48 is now positively contained between the emergency piston 37 and the closure member wall 28 through the threaded engagement of the body member 68 and base wall extension 53 and the bearing engagement between the bearing surface 72 of the flange 71 and the closure member end wall 28. Upon retractile movement of the emergency piston 37 toward its inoperative position, the spring forces of the friction device are utilized to move the slack adjustor 16, push rod 66, service piston extension 62 and the service piston 59 in follow-up relation toward their inoperative positions wherein the friction device is now mechanically de-energized so that the vehicle can now be moved to a more advantageous and less dangerous position. Any fluid pressure which the system 1 may contain can be utilized to initiate a service application, as previously described, to effect energization of the friction device when the disabling means 67 is actuated to overcome the emergency function of the emergency spring 48; and in this manner, the vehicle can be controllably moved to a more advantageous and less dangerous position to correct the fluid pressure failure.

When the fluid pressure failure has been corrected and the fluid pressure in the reservoir 6 is increased to an amount greater than the predetermined amount wherein normal operating conditions are now re-established, the fluid pressure in the emergency chamber 43 of the actuating cylinder 9 is correspondingly increased to re-establish the magnitude of the emergency force. When the magnitude of the emergency force becomes greater than that of the compressive force of the spring 48, it is apparent that said emergency force will maintain the emergency piston 37 in its inoperative position against the spring force, and the body member 68 of the disabling means 67 may now be freely returned to its original position.

Of course, the operator may initiate the emergency function of the actuating cylinder 9, if he so desires, by "dynamiting" the system 1. To "dynamite" the system 1, the operator merely rotates the charging valve passage means 10 in a clockwise direction (opposite to the arrow in FIG. 1) to a position aligned between the outlet 8 and the exhaust port 11 of the charging valve 4 thereby venting the emergency chamber 43 to atmosphere. With the emergency chamber 43 vented to atmosphere, the emergency function of the actuating cylinder 9 is initiated, as described hereinbefore, to effect mechanical energization of the friction device.

Referring now to FIG. 5, another friction device operating mechanism or actuating cylinder 109 is shown having substantially the same component parts and functioning in the system 1 in substantially the same manner as the previously described actuating cylinder 9 with the following exceptions. The piston head 40 of the emergency piston 37 is provided with an integral cylindrical extension 110 having a peripheral surface 111 slidably received in the abutment member bore 23 in sealable engagement with the O-ring seal 25, and a bore 112 is axially provided through the cylindrical extension 110 and the piston head 40 in communication with the sleeve member bore 39. A push rod 113 extends coaxially through the bore 112 having one end connected with the service piston 59 by suitable means, such as staking at 114, and the other end operatively connected with the slack adjustor 16, as previously mentioned. Although the push rod 113 is fixedly connected to the service piston 59, it is apparent that a pivotal connection therebetween could be utilized which is a well-known expediency in the art. The base wall 49 is provided with an integrally formed, radially extending flange 115 which is fixedly connected to the rightward end of the emergency piston sleeve 38 by suitable means, such as a plurality of screws 116, and the emergency spring 48 is biased between said flange 115 and closure member end wall 28.

It is now apparent that novel friction device operating mechanisms or actuating cylinders meeting the objects set out hereinbefore are provided and that changes or modifications to the precise configurations, shapes or details of the constructions set forth in the disclosure by way of illustration may be made by those skilled in the art without departing from the spirit of the invention as defined by the claims which follow.

The embodiments of the invention in which an exclusive property or privilege is claimed are defined as follows:

1. A friction device operating mechanism comprising a housing having an expansible chamber therein, resiliently urged means normally opposing expansion of said chamber and including extension means extending exteriorly of said housing, another expansible chamber in said resiliently urged means, actuator means opposing expansion of said other chamber and including a reduced portion extending through said extension means and having a working end exteriorly of said housing, means for introducing fluid pressure into said other chamber, said actuator being movable in a working direction in response to fluid pressure in said other chamber to actuate said reduced portion and energize the working end thereof, and means for introducing fluid pressure into said first named chamber, said resiliently urged means being movable in response to fluid pressure in said first named chamber less than a predetermined amount to urge said actuator in a working direction to actuate said reduced portion and energize the working end thereof.

2. A friction device operating mechanism comprising a housing, resiliently urged means including extension means movable in said housing and defining therewith an expansible fluid pressure chamber, other means adapted for relative and concert movement with said resiliently urged means and defining therein another expansible fluid pressure chamber including other extension means extending through said resiliently urged means and first named extension means and having a working end exteriorly of said housing, said other means being movable relative to said resiliently urged means in response to fluid pressure in said other chamber and movable in concert with said resiliently urged means upon movement thereof in response to fluid pressure in said first named chamber less than a predetermined value to actuate said other extension means and the working end thereof.

3. The friction device operating mechanism according to claim 2 wherein said resiliently urged means and the other means include opposed effective areas respectively responsive to fluid pressure in said other chamber wherein fluid pressure in said other chamber acting on the effective area of said resiliently urged means establishes a force in opposition to movement thereof when the fluid pressure in said first named chamber is less than the predetermined value to limit the intensity of the actuation of said extension means and working end.

4. The friction device operating mechanism according to claim 2 comprising abutment means for engagement between said resiliently urged means and other means to effect the concert movement thereof upon movement of said resiliently urged means when the fluid pressure in said first named chamber is less than the predetermined value.

5. The friction device operating mechanism according to claim 2 comprising disabling means drivingly engaged with said resiliently urged means and providing a mechanical connection between said resiliently urged means and housing upon movement of said resiliently urged means to actuate said other extension means and the working end thereof, said disabling means being movable in response to an applied force thereon to drive said resiliently urged means in a direction to mechanically de-actuate said other extension means and the working end thereof.

6. The friction device operating mechanism according to claim 2 wherein said housing includes a pair of bores in which said resiliently urged means and first named extension means are slidable, said first named chamber being defined in one of said housing bores.

7. The friction device operating mechanism according to claim 6 wherein said resiliently urged means includes piston means slidable in said one bore, said first named extension means being connected with said piston means and slidable in the other of said bores, and spring means urging said piston means in opposition to fluid pressure expansion of said first named chamber.

8. The friction device operating mechanism according to claim 7 wherein said housing includes an aperture, an extension on said piston means and opposed to said first named extension means, and disabling means slidable in said aperture and adapted for driving engagement with said piston means extension and bearing engagement with said housing means, said disabling means being movable in response to an applied force into bearing engagement with said housing and into driving engagement with said piston means extension to mechanically move said piston means against said spring means and de-actuate the working end of said other means when the fluid pressure in said first named chamber is less than the predetermined value.

9. The friction device operating mechanism according to claim 8 including a threaded peripheral surface on said piston means extension, a threaded bore in said disabling means threadedly engaged with said threaded peripheral surface, and an applied force transmitting flange on said disabling means for bearing engagement with said housing, said disabling means being initially movable in response to the applied force on said flange to move said flange into bearing engagement with said housing and thereafter movable into further threaded engagement with said threaded peripheral surface to effect the mechanical movement of said piston means against said spring means.

10. The friction device operating mechanism according to claim 7 including a stepped bore in said piston means and first named extension means, said other means including another piston means slidable in the larger of said stepped bores and defining therein said other chamber, said other extension means being connected with said other piston means and extending through the smaller of said stepped bores.

11. The friction device operating mechanism according to claim 7 wherein said housing includes a closure member, said spring means being biased between said piston means and closure member, and retaining means engaged between said housing and closure member to prevent displacement of said closure member from said housing in response to the force of said spring means.

12. The friction device operating mechanism according to claim 11 including an annular flange on said closure member slidable in said one housing bore, a plurality of aperture means in said housing and intersecting with said one housing bore including stud head receiving portions, a plurality of threaded apertures provided in said closure member flange for alignment with said aperture means, said retaining means including a stud inserted through each of said aperture means into threaded engagement with each of said threaded apertures and having a head portion adapted for abutting engagement with each of said head receiving portions, said spring means serving to urge said closure member in a direction to abuttingly engage said stud heads with said head receiving portions to obviate rotation of said studs and prevent threaded disengagement thereof from said threaded apertures.

13. The friction device operating mechanism according to claim 7 wherein said piston means includes a sleeve member slidable in said one housing bore and having a bore therein, opposed end walls connected with said sleeve portion and defining said sleeve member bore, said first named extension means being connected with one of said end walls, another bore extending through said first named extension means and said one end wall and connecting with said sleeve member bore, and said other means including another piston means slidable in said sleeve member bore and defining therewith and the other of said end walls said other chamber, said other extension means being connected with said other piston means and extending through said sleeve member and other bores.

14. The friction device operating mechanism according to claim 13 comprising an atmospheric chamber defined in said sleeve member bore between said other piston means and one end wall, the radial clearance between said other bore and said other extension means providing a passage to vent said atmospheric chamber to the atmosphere.

15. The friction device operating mechanism according to claim 14 wherein said other end wall includes a wall member slidable in said sleeve portion bore, and means engaged between said sleeve portion and said wall member to retain said wall member against displacement from said sleeve bore in response to fluid pressure in said other chamber.

No references cited.

RICHARD B. WILKINSON, *Primary Examiner.*